J. E. PARRISH.
ROLLER BEARING.
APPLICATION FILED OCT. 19, 1908.
927,160.
Patented July 6, 1909.
2 SHEETS—SHEET 1.
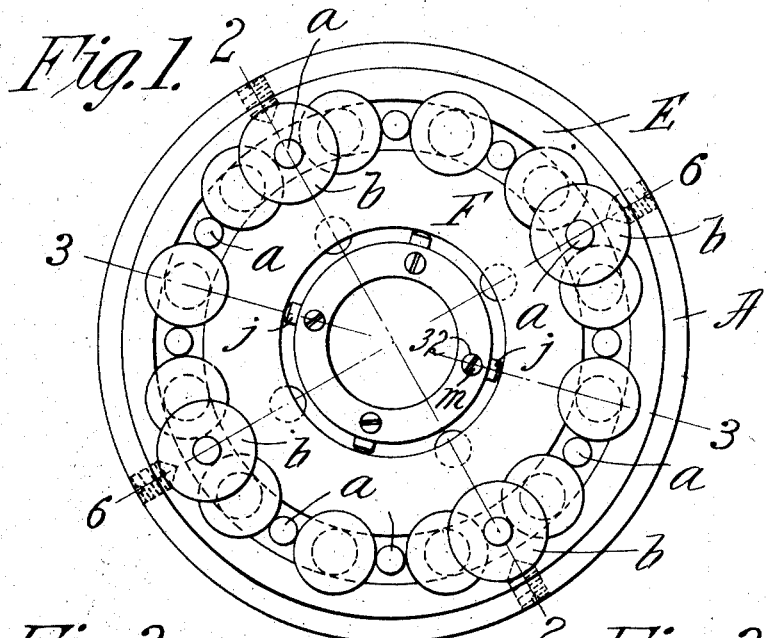
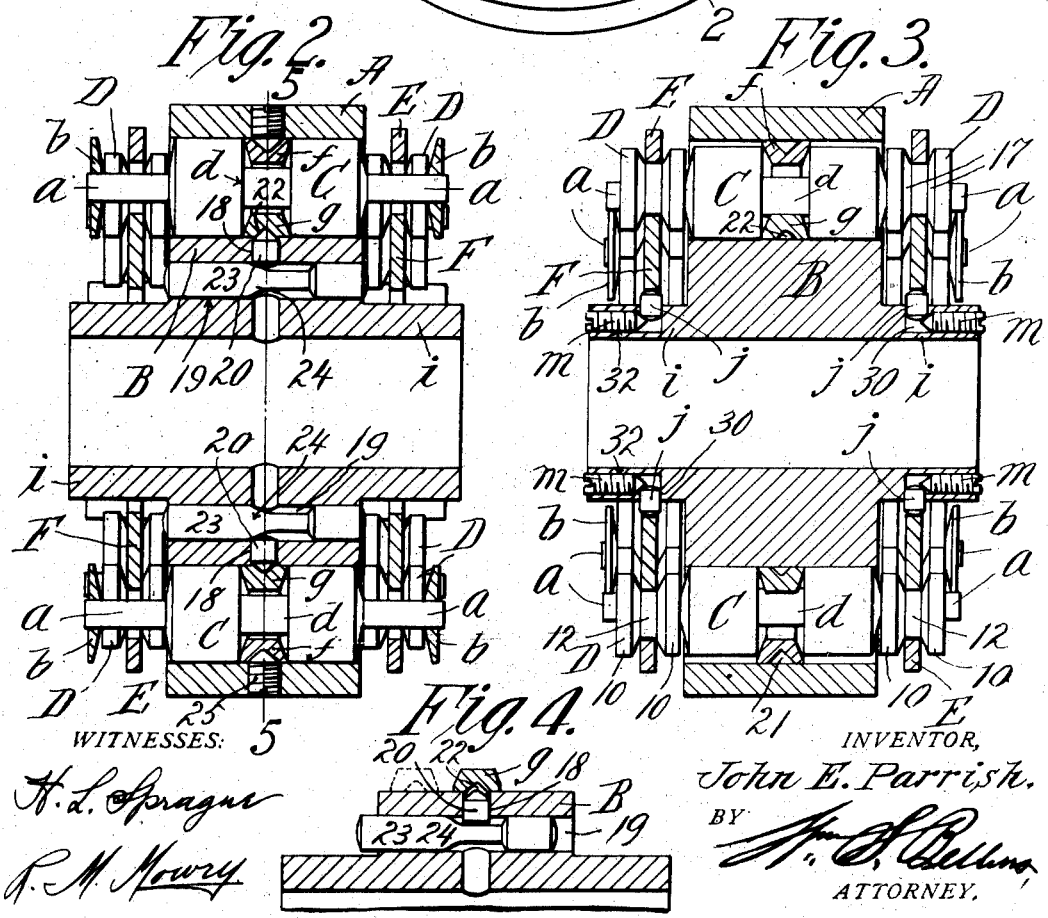
WITNESSES:
INVENTOR,
John E. Parrish.
BY
ATTORNEY.

J. E. PARRISH.
ROLLER BEARING.
APPLICATION FILED OCT. 19, 1908.

927,160.

Patented July 6, 1909.
2 SHEETS—SHEET 2.

WITNESSES:
H. L. Sprague
P. M. Mowry

INVENTOR,
John E. Parrish,
BY
ATTORNEY.

UNITED STATES PATENT OFFICE.

JOHN E. PARRISH, OF SPRINGFIELD, MASSACHUSETTS.

ROLLER-BEARING.

No. 927,160.          Specification of Letters Patent.          Patented July 6, 1909.

Application filed October 19, 1908. Serial No. 458,372.

*To all whom it may concern:*

Be it known that I, JOHN E. PARRISH, a citizen of the United States of America, and resident of Springfield, in the county of Hampden and State of Massachusetts, have invented certain new and useful Improvements in Roller-Bearings, of which the following is a full, clear, and exact description.

This invention relates to improvements in roller bearings of the class in which rollers in sidewise separated relations are provided between an outer annular or cylindrically chambered member and an inner member of cylindrical form with a secondary series of rollers in peripheral contact between suitable portions of the primary rollers for preventing what is sometimes termed "cross friction" or sliding or wiping surface contacts of the primary rollers which are between the inner and outer members of the bearings, one on another.

The principal object of this invention is to provide constructions and arrangements of parts including primary and secondary series of rollers whereby not only cross friction is avoided between the rollers, but whereby there is practically no sliding or wiping movements of any of the interengaged parts one on another.

Another object is to produce the roller bearing device, having advantages above referred to, of extreme simplicity of construction and practicability of assemblage.

Other objects are attained in and by constructions, combinations, and arrangements of parts which constitute this invention as hereinafter described in conjunction with the accompanying drawings and as set forth in the claims.

Figure 5:
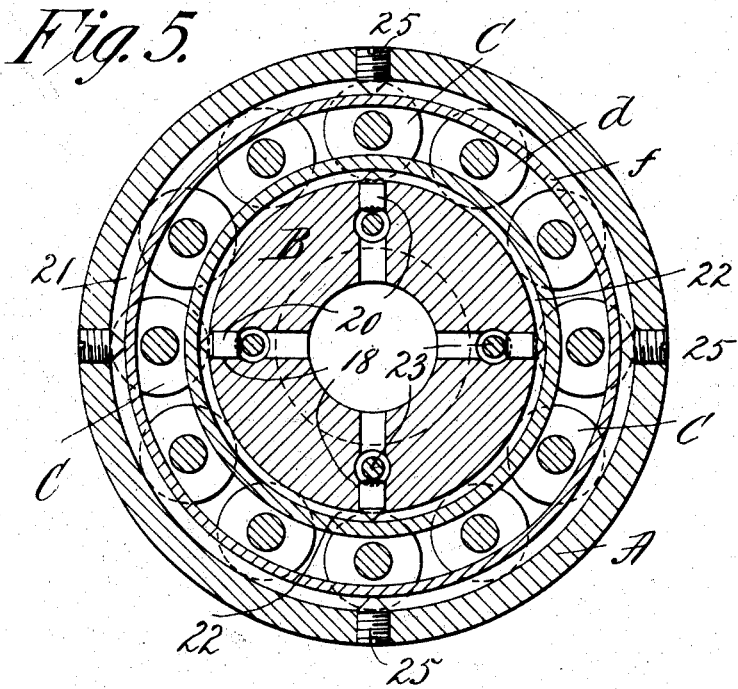
Figure 6:
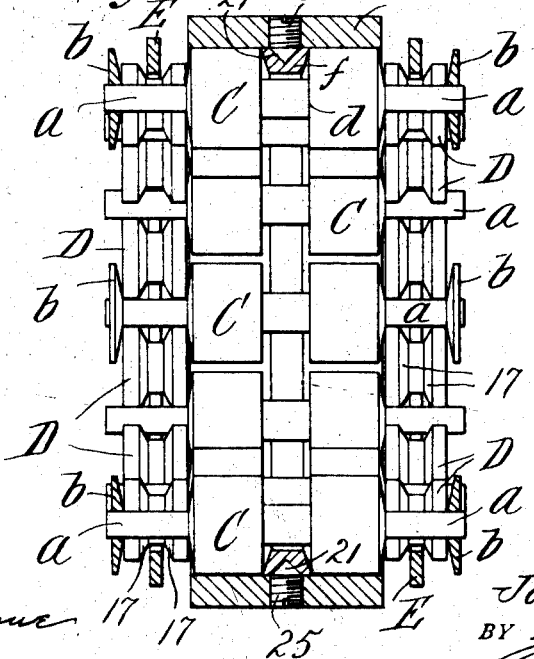

In the drawings:—Figure 1 is an end face view of the roller bearing device; Figs. 2 and 3 are sectional views on the plane of the axis as variously taken on the lines 2—2 and 3—3, Fig. 1; Fig. 4 is a sectional view of parts represented in Fig. 2, but showing some of them as in slightly changed relations; Fig. 5 is a sectional view transversely of the axis of the device as taken on the plane indicated by line 5—5, Fig. 2; Fig. 6 is a sectional view somewhat similar to Figs. 2 and 3, but as taken on the plane indicated by line 6—6, Fig. 1,—the inner cylindrical member of the bearing being absent.

Similar characters of reference indicate corresponding parts in all of the views.

In the drawings,—A represents an outer annular or cylindrically chambered member within which the bearing is inclosed, and B represents a cylindrical member concentrically within the one A; and the same may be solid or made with a central aperture whereby it may be applied as a bushing to fit and be affixed to a shaft or arbor.

C C represent a series of sidewise separated primary rollers, between, and peripherally bearing on, the surfaces of the outer annular and inner cylindrical members A and B; and these rollers have axial end extensions $a$ of reduced diameter. D D represent shorter rollers or trucks of a secondary series comprising axially alined cylindrical heads 10, 10 and head-uniting necks 12, as shown by these reference numerals on Fig. 3, said heads being arranged between and having peripheral bearings on the reduced end extension $a$ of the primary rollers, and maintaining them in their sidewise separated arrangements.

E and F represent edgewise separated and concentric rings both in the same plane transversely of the axis of the device and having their adjacent margins overlapped within the inner faces of the opposite heads of the rollers of the secondary series; and within the annular space between said rings the roller necks are accommodated and through and outwardly beyond which space the said reduced extensions $a$ of the primary rollers project.

A plurality of centrally apertured disks $b$ are affixed by having hard driving fit on several of the reduced roller extensions, said disks having their inner faces beveled from their periphery toward their axis, or made in the form of a cone or conoid; and said disks constituting shoulders on the primary roller extension $a$ have overlapping relations relatively to the adjacent marginal outer surfaces of the rollers D, and by reason of their beveled or conical formations, have, in the action of the bearing wherein they rotate on their individual axes and also have planetary movement, not frictional sliding or wiping contacts on the roller ends, but rolling contact thereon.

The primary rollers have comparatively deep grooves $d$ between their ends, engaged in which are ribs constituted by rings $f$ and $g$ detachably fitted and secured, with their locations in a coincident plane, the one within the annular outer member A and the other on the periphery of the cylindrical member B,—such rib and groove engagement preventing endwise displacement of the primary rollers. The rings E and F maintain the secondary rollers or trucks always in the same plane and collectively against endwise displacement or lash relatively to the rings themselves and the disks b restrain the rings, and the therewith interlocked rollers D from having any axial movement. The rings, moreover, being always maintained in their concentric relations, one to another, and both to the axis of the bearing as a whole, correspondingly keep the series of secondary rollers or trucks to their bearings on the primary roller extensions a at all places around the bearing.

The inner faces of the heads 10, 10, of the secondary rollers D are beveled and relatively convergent toward the head-uniting necks as indicated at 17 in Figs. 3 and 6; and it is by these beveled portions of such rollers that the rolling bearings between the latter and the corners of the rings are acquired, thus obviating the possibility of friction between the inner surfaces of the roller head and the inner and outer faces of the rings. The aforementioned ribs f and g of the inner and outer members A and B of the device are also made with beveled sides on which the corner edges of the primary rollers C C have rolling bearing engagements, thereby obviating face friction at these places of line contact,—it being here mentioned that there will be little liability of the last mentioned parts of the bearing becoming cut or worn because of the absence of any cause of end thrust, as all pressures to which the bearing is subjected are in a direction across, and not along the line of, the axis.

This bearing, the parts of which are in compact and interengaged relations as shown, requires for the assemblage of such parts the exercise of a considerable degree of ingenuity; and the construction and relative arrangements of some of the parts making for practicability of assemblage will be now pointed out.

The member B has between its ends a plurality of radial sockets 18 which open to its periphery, and it also has holes 19 parallel with its axis leading from end to end of the member B and intersecting said sockets. Pieces 20 shown as having the form of cylinders or small plugs with conical ends are movably fitted in said sockets.

The rib forming ring g which has a close sliding fit circumferentially on the bearing member B is preferably internally recessed, as by having a continuous annular groove 22 therein. Pins 23 constructed with necked down tapered portions 24 have driving fits in said holes 19, and by their tapered portions engage the inner ends of the little plugs or pieces 20 and outwardly force them to their engagements by their outer conical ends in the internal groove of the rib-forming ring.

The rib forming groove f for the outer annular member A of the bearing is peripherally grooved and when slid to its proper intermediate position is retained by the engagement in its groove 21 by the conical end of the screw plug 25, this form of engagement being pluralized in a desirable degree as apparent in the drawings. The rollers C C and the rib forming rings f and g are interengaged and then slid to place in the annular space between the bearing members A and B and the confinement of the rib forming rings is then effected by the means above described.

The partial sectional view, Fig. 4, shows how by forcing the pin 23 a short distance endwise, its tapered or cam like portion 24 is positioned to permit the confining piece or plug 20 to recede inwardly from its engagement with the rib forming ring g so that the latter may be slid off from, or up to, the position which it is required to occupy in the properly assembled device.

I will now describe the specific means here provided for adjusting the rings F and E to, and maintaining them in, their concentric positions, reference being had to Figs. 2 and 3. The inner cylindrical member B has cylindrical hub-like end extensions i of reduced diameter made with sockets 30 opening to their peripheries and having holes 32 leading from their ends and intersecting said sockets. Pieces j, which advantageously may be composed of hardened fiber and having rounded or conical outer ends are movably fitted in the socket 30, and screws m made with conical ends have thread engagements in the holes 32 and exert cam-like and outwardly forcing actions against the pieces j for adjusting and maintaining them in their engagement with the inner edge of the inner one F of the rings. The inner ring being held in its proper position will control the position, concentrically therewith, of the outer ring E through the medium of the rollers D.

In the operation of the roller bearing device, assuming that one of the members, either the outer one A or the inner one B, is stationary and the other is revolved, the action of the revolving one will cause rolling and planetary movements of the primary rollers C, and the secondary rollers D which have planetary movements concurrently with the primary rollers have, individually, rotations in directions the reverse of the directions of rotations of the primary rollers and the rings E and F which form circular tracks around which the secondary rollers have running engagements, incidentally, partake of turning movements as imparted to them by the rotating and also revolving secondary rollers, the outer ring moving considerably slower than the inner one by reason of the rollers C having to operate on greater circumferential surface.

I claim:—

1. In a device of the character described, an outer annular member and a cylindrical member in a concentric and separated relation therewithin, a series of sidewise separated primary rollers between, and peripherally bearing on, the surfaces of the annular and cylindrical members and having axial end extensions of reduced diameter, a secondary series of rollers comprising axially alined cylindrical heads and head-uniting necks, said heads being arranged between, and having peripheral bearings on, the reduced end extensions of the primary rollers and maintaining them in their sidewise separated arrangements, separated and concentric rings having their adjacent margins overlapped by the inner faces of the roller heads, the roller necks being loosely accommodated in the annular space between said rings and the said reduced roller extensions projecting through said space, and shoulder constituting parts on the portions of several of the said reduced roller extensions next outside of the said ends of the secondary rollers.

2. In a device of the character described, an outer annular member and a cylindrical member in concentric and separated relation therewithin, said members having ribs between their ends in a coinciding transverse plane, a series of sidewise separated primary rollers between, and peripherally bearing on, the surfaces of the annular and cylindrical members having intermediate grooves engaging said ribs and having axial end extensions of reduced diameter, a secondary series of rollers comprising axially alined cylindrical heads and head-uniting necks, said heads being arranged between, and having peripheral bearings on, the reduced end extensions of the primary rollers, separated and concentric rings having their adjacent margins overlapped by the inner faces of the roller heads, the roller necks being loosely accommodated and said reduced roller extensions projecting through and beyond said space, and a plurality of centrally apertured disks having driving fits on several of the reduced roller extensions and located in proximity to the outer faces of the secondary rollers.

3. In a device of the character described, an outer annular member, and a cylindrical member arranged concentrically therewithin, a series of sidewise separated primary rollers between, and peripherally bearing on, the surfaces of the annular and cylindrical members and having axial end extensions of reduced diameter, a secondary series of rollers comprising axially alined cylindrical heads having beveled inner faces and head-uniting necks, said heads being between and having peripheral bearings on the reduced end extensions of the primary rollers, concentric and separated rings, with their adjacent margins overlapped by and having rolling bearings on the inner beveled faces of the roller heads, and a plurality of centrally apertured disks having driving fits on several of the reduced roller extensions, and having their inner faces beveled for rolling bearing engagements with the adjacent marginal portions of said secondary rollers.

4. In a device of the character described, an outer annular member and a cylindrical member of smaller diameter arranged concentrically therewithin, having end portions of reduced diameter, and having radial outwardly opening sockets, and threaded holes parallel with the axis of the cylindrical member, intersecting said sockets, a series of sidewise separated primary rollers between, and peripherally bearing on, the surfaces of said members and having axial end extensions of reduced diameter, a secondary series of rollers comprising cylindrical heads and head-uniting necks, said heads being arranged between, and having peripheral bearings on, the reduced end extensions of the primary rollers, separated and concentric rings having their adjacent margins overlapped by the inner faces of the roller heads, shoulder constituting parts on the portions of several of the said reduced roller extensions next outside of the said secondary rollers ring adjusting pieces fitted in and protruding outwardly beyond said sockets, and screws, having conical ends, in said holes and by their conical ends engaging the ring adjusting pieces.

5. In a device of the character described, an outer annular member and a cylindrical member arranged concentrically therewithin having between its ends a radial socket opening to its periphery, having a hole parallel with its axis intersecting said socket, a piece movably fitted in said socket, a rib-forming ring fitted about the cylindrical member at its socket portion, and internally recessed, a pin having a tapered portion having a driving fit in said hole and by its tapered portion engaging the inner end of said piece for outwardly forcing it whereby its protruding end will engage in the internal ring recess, a series of sidewise separated primary rollers between and peripherally bearing on the surfaces of the annular and cylindrical members having intermediate grooves in which said rib constituting ring engages and having axial end extensions of reduced diameter, a secondary series of rollers comprising end heads and uniting necks, said members being between and peripherally bearing on the reduced end extensions of the primary rollers, concentric and separated rings with their adjacent margins overlapped by the inner faces of the roller heads, and parts carried on several of the reduced extensions of he primary rollers which have overlapping bearing engagements wit adjacent end portions of said secondary rollers.

6. In a device of the character described, an outer annular member and a cylindrical member arranged concentrically therewithin having between its ends a plurality of radial sockets opening to its periphery having holes parallel with its axis leading from end to end of the member and intersecting said sockets, pieces having tapered outer ends movably fitted in said sockets, a rib-forming ring fitted about the cylindrical member at its socketed portion, and internally grooved, pins at intermediate portions thereof constructed with tapered necked down portions having driving fits in said holes and by their tapered portions engaging the inner end of said pieces for outwardly forcing them to engagements by their outer conical ends in the internal groove, a series of sidewise separated primary rollers between and peripherally bearing on the surfaces of the annular and cylindrical members having intermediate grooves in which said rib constituting ring engages and having axial end extensions of reduced diameter, a secondary series of rollers comprising end heads and uniting necks, said members being between and peripherally bearing on the reduced end extensions of the primary rollers, concentric and separated rings with their adjacent margins overlapped by the inner faces of the roller heads, and parts carried on several of the reduced extensions of the primary rollers which have overlapping bearing engagements on adjacent marginal portions of said secondary rollers.

7 In a device of the character described, an outer annular member and a cylindrical member arranged concentrically therewithin having between its ends a plurality of radial sockets opening to its periphery, having holes parallel with its axis leading from end to end of the member and intersecting said sockets, and said cylindrical member having cylindrical hub-like end extensions of reduced diameter made with sockets opening to their peripheries and having holes leading from their ends intersecting said sockets, pieces having tapered outer ends movably fitted in said first named sockets, a rib-forming ring fitted about the cylindrical member at its socketed portion, and internally grooved, pins at intermediate portions thereof constructed with tapered necked down portions having driving fits in said holes and by their tapered portions engaging the inner end of said pieces for outwardly forcing them to engagements by their outer conical ends in the internal groove of said ring, a rib forming ring detachably confined within the outer annular member between its ends, a series of sidewise separated primary rollers between and peripherally bearing on the surfaces of the annular and cylindrical members having intermediate grooves in which said rib constituting rings engage and having axial end extensions of reduced diameter, a secondary series of rollers comprising end heads and uniting necks, said members being between and peripherally bearing on the reduced end extensions of the primary rollers, concentric and separated rings having their adjacent margins overlapped by the inner faces of the roller heads, engagements on adjacent marginal portions of said rings, pieces movably fitted in the sockets in the said hub-like portions of the cylindrical member, screws, in the axially parallel holes in said members,— having tapered ends engaging and for outwardly forcing the last said pieces to engagements with the inner edge of the inner one of said rings, and disks affixed on the outer reduced extremities of the primary rollers, formed with substantially conical inner faces which have rolling bearings on the adjacent outer ends of said secondary rollers.

Signed by me at Springfield, Mass., in presence of two subscribing witnesses.

JOHN E. PARRISH.

Witnesses:
 WM. S. BELLOWS,
 G. R. DRISCOLL.